(12) United States Patent
Hendricks

(10) Patent No.: US 6,601,264 B1
(45) Date of Patent: Aug. 5, 2003

(54) CLEANING DEVICE FOR NARROW SPACES OF MOTOR VEHICLES

(76) Inventor: Mark A. Hendricks, 103 Rainbow Blvd., Indianapolis, IN (US) 46234

( * ) Notice: Subject to any disclaimer, the term of this patent is extended or adjusted under 35 U.S.C. 154(b) by 109 days.

(21) Appl. No.: 09/768,709

(22) Filed: Jan. 24, 2001

Related U.S. Application Data

(63) Continuation-in-part of application No. 29/124,382, filed on Jun. 5, 2000.

(51) Int. Cl.⁷ .............................. A47L 1/15; A47L 13/10
(52) U.S. Cl. ...................... 15/244.1; 15/220.1; 15/210.1
(58) Field of Search ............................ 15/220.1, 143.1, 15/210.1, 244.1; 601/135, 137, 138

(56) References Cited

U.S. PATENT DOCUMENTS

| | | | |
|---|---|---|---|
| 1,984,154 A | | 12/1934 | Pilato |
| 2,070,123 A | * | 2/1937 | Grant |
| 2,127,674 A | * | 8/1938 | Clarke |
| 2,537,482 A | | 1/1951 | Reilly |
| 2,613,384 A | | 10/1952 | Collins |
| 2,746,070 A | * | 5/1956 | Parker |
| 3,074,095 A | | 1/1963 | Woods |
| 3,220,040 A | | 11/1965 | Knaebe |
| 3,526,918 A | | 9/1970 | Leland |
| 4,117,566 A | * | 10/1978 | Ward |
| 4,318,201 A | | 3/1982 | Rogers et al. |
| 4,615,553 A | | 10/1986 | Hultine |
| 5,074,046 A | | 12/1991 | Kolesky |
| 5,161,279 A | | 11/1992 | Sager et al. |
| 5,603,138 A | | 2/1997 | Bonis |
| 5,659,916 A | * | 8/1997 | Beatty |
| 5,953,785 A | | 9/1999 | Malmborg |
| 6,516,489 B2 | * | 2/2003 | Rose |

\* cited by examiner

*Primary Examiner*—Randall E. Chin
(74) *Attorney, Agent, or Firm*—Woodard, Emhardt, Moriarty, McNett & Henry LLP

(57) ABSTRACT

A cleaning device having a sponge on one end of flat, one-piece, elongated, resilient handle, and a transverse hand grip on the opposite end of the handle, for cleaning the facing surfaces of closely spaced motor vehicle parts such as the truck cab and truck cap of a pickup truck.

8 Claims, 3 Drawing Sheets

CLEANING DEVICE FOR NARROW SPACES OF MOTOR VEHICLES

CROSS-REFERENCE TO RELATED APPLICATION

This application is a continuation-in-part of application Ser. No. 29/124,382, filed Jun. 5, 2000, entitled, "Cleaning Device for Narrow Spaces of Motor Vehicles."

BACKGROUND OF THE INVENTION

This invention relates generally to cleaning devices and, more particularly, to devices for simultaneously cleaning the facing surfaces of closely spaced motor vehicle parts.

One example of the type of narrow space for which this invention is contemplated is the space between the truck cab and truck cap on a pickup truck. The truck cab and cap typically have facing window surfaces that are difficult to clean because of the narrowness of the space between them.

One type of cleaning device for such windows has been proposed, as described in U.S. Pat. No. 5,161,279 to Sager et al. The disclosed device has a rigid handle attached to a head having two radial portions capable of pivoting with respect to a central head portion. The radial portions are normally aligned with each other and are thin enough that the head in its relaxed state fits readily into the space between the windows. The radial portions are designed to pivot in opposite directions upon contact with the opposing window surfaces when the handle is twisted, such that one radial portion can be used to clean one window while the other radial portion cleans the other window. Since the two radial portions are diametrically opposed, the areas cleaned on the two windows in a given stroke are offset from each other, and the device is thus not as efficient or convenient to use as might be desired.

A rigid handle also has drawbacks, one of which is the tendency to scratch the paint at the entrance to the narrow space in which the cleaning device is used, particularly in cases where the space has some degree of curvature.

In spite of the known efforts, a need remains for a simple, effective, inexpensive cleaning device for narrow spaces of motor vehicles.

SUMMARY OF THE INVENTION

The present invention overcomes the above-referenced disadvantages and other disadvantages of the prior art by providing a cleaning device for narrow spaces of motor vehicles which includes a one-piece elongated, resilient handle having first and second ends and a transverse hand grip on the first end, the hand grip having a cross member perpendicular to the longitudinal axis of the handle, and a sponge mounted on the second end of the handle.

According to another aspect of the present invention, a cleaning device for narrow spaces of motor vehicles is provided with a flat, one-piece, elongated, resilient handle having a parallel pair of major surfaces and adapted to deflect a distance of 4 inches over a given length of approximately 2 feet in an axial plane perpendicular to said major surfaces in response to a deflection force of approximately 5 ounces applied at one end of the given length in a direction perpendicular to said major surfaces in their relaxed state. The handle includes a cross member integrally formed on one end thereof. The cleaning device further includes a sponge mounted on and enclosing the cross member on the one end of the handle and having an exposed sponge face on each major surface of said handle.

It is a general object of the present invention to provide a simple, effective, inexpensive cleaning device for narrow spaces of motor vehicles.

A specific object of one aspect of the invention is to provide a simple, effective, inexpensive method of cleaning the facing windows in a truck cab and truck cap of a pickup truck, and of doing so without scratching the paint on the truck during manipulation of a tool handle in the narrow space between the truck cab and truck cap.

These and other objects and advantages of the present invention will be more apparent upon reading the following detailed description in conjunction with the accompanying drawings.

DETAILED DESCRIPTION OF THE PREFERRED EMBODIMENT

Figure 1:
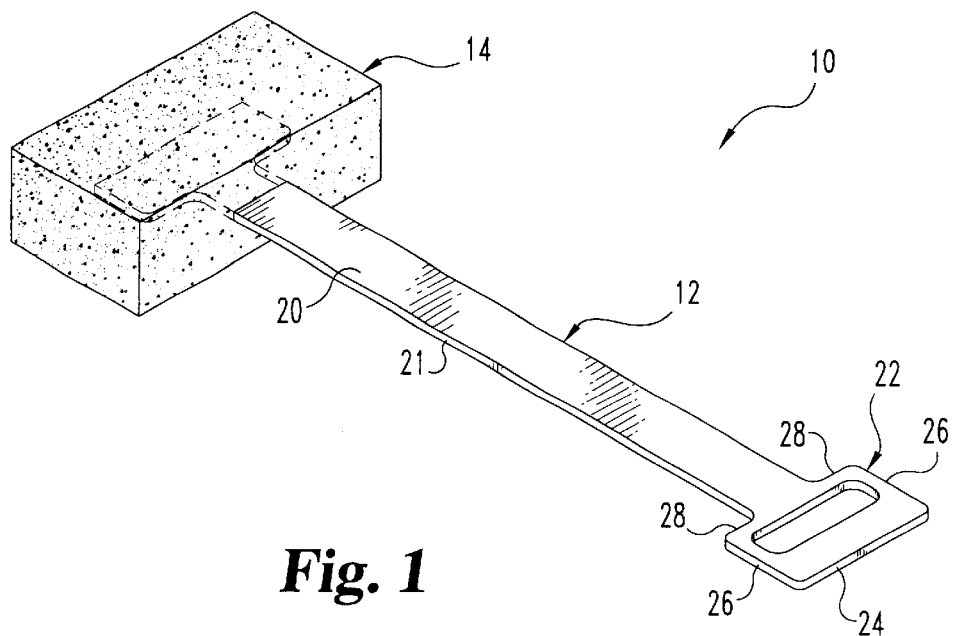
FIG. 1 is a perspective view of the preferred embodiment of a cleaning device according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

A cleaning device 10 according to the present invention preferably has a flat, one-piece, elongated, resilient handle 12 with a sponge 14 mounted on one end thereof as illustrated in the drawings. The sponge is supported by a cross member 16 integrally formed on the end of the handle and is symmetrically mounted with respect to the plane of the handle, thereby providing two sponge faces 18 equally spaced from the major surfaces 20 of the handle for simultaneous contact with two facing surfaces such as the facing windows in a truck cab and truck cap. A transverse hand grip 22 is provided on the opposite end of the handle in the form of a cross member 24 that is perpendicular to the longitudinal axis of the handle and spaced from the remainder of the handle by a pair of side supports 26. The transverse hand grip has been found to provide superior handling characteristics for the cleaning device. The cross member of the hand grip preferably has an axial dimension of 1 to 1½ inches in order to fit snugly in the closed hand of a user.

Figure 2:
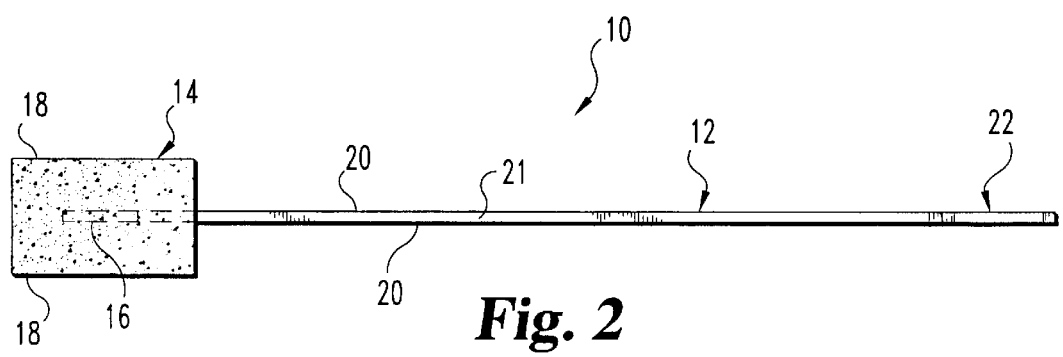
FIG. 2 is a side view of the cleaning device of FIG. 1.
Figure 3:
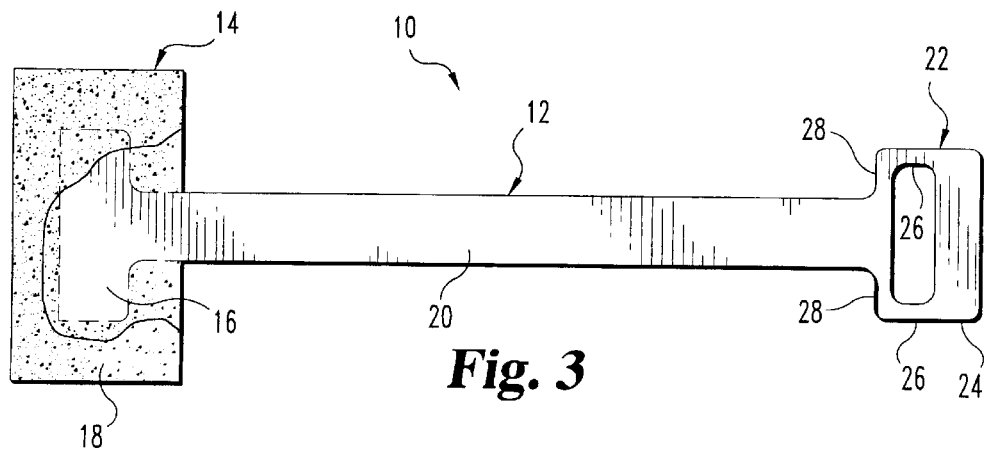
FIG. 3 is a partially cutaway top view of the cleaning device of FIG. 1.

It is important for the handle to be flexible enough to follow any curvature that may exist in a narrow space such as that between a truck cab and truck cap yet not be so flexible as to inhibit operation. One example of a handle having suitable flexibility is made of a foamed, closed-cell polyvinyl chloride (PVC) commercially available from Alusuisse Composites, Inc., Benton, Ky., under the brand name SINTRA®. A suitable-handle length is 2 feet, although other lengths are contemplated as described below. The entire handle preferably has a planar configuration as shown in FIGS. 1–3, with a uniform thickness of ¼ inch and with a width of 1¾ inches except at the hand grip and cross member 16. Cross member 16 is 5¾ inches wide by 1¾ inches in axial length. The hand grip is approximately 4½ inches wide and has a total axial length of 2½ inches (with an open space therein approximately 3½ inches wide by 1 inch in axial length). Side supports 26 are each ⅜ inch wide, and transverse support elements 28 on the hand grip are ⅜ inch in axial length. The edges of the handle are preferably chamfered or otherwise made smooth in order to reduce the likelihood of scratching paint on exposed vehicle body surfaces such as at the entrance to a narrow space in which the cleaning device is used.

Figure 5:
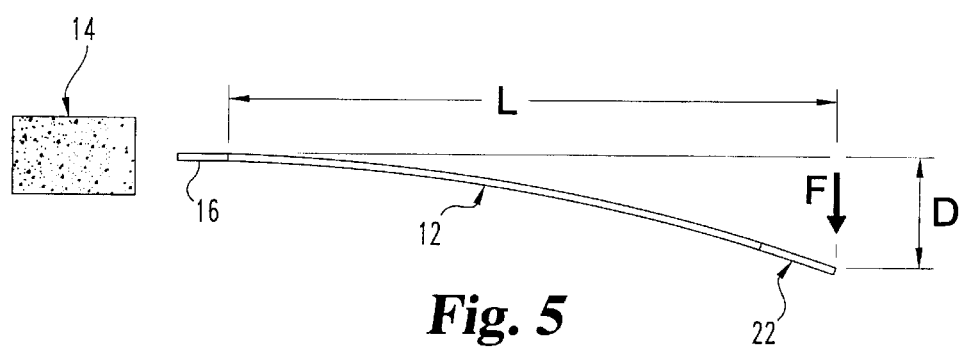
FIG. 5 is an exploded side view of the cleaning device of FIG. 1 illustrating the flexibility of the handle thereof.

With reference to the exploded side view of FIG. 5, a PVC handle constructed as just described, with the cross member 16 vertically constrained, deflects a distance (D) of 4 inches over the exposed length (L) of approximately 2 feet in response to a vertical force of 5 ounces applied at the grip end as depicted by the arrow F in the drawing.

It will be understood that, while the handle is capable of deflection as just described, it is nevertheless flat in the sense of having its major surfaces 20 essentially parallel and distinctly greater in dimension than its minor surfaces 21.

The handle may alternatively be injection molded of polypropylene. This offers an advantage of lower manufacturing costs. The dimensions may be the same as those described above, and the edges may be molded with a radius, or the minor surfaces 21 may be entirely rounded, in order to minimize scratching as described above.

A polypropylene handle constructed of PP2350 Natural, from G.E. Polymerland, with the dimensions described above, except with an overall length of 30 inches, was measured for flexibility as follows. The head end was vertically constrained so as to expose a length of two feet from the tip of the grip end and toward the head end. So constrained, the handle was found to deflect approximately 2 inches without any external deflection force applied. From that resting position, the handle was found to deflect a distance of 4 inches over the exposed length of 2 feet in response to a vertical force, i.e., added weight, of 4.5 ounces applied at the tip of the grip end as depicted by arrow F in FIG. 5.

The handle may be made somewhat less flexible if desired. For example, the handle dimensions may be changed such that the handle is subject to approximately 10–15% less deflection for the same applied force. A somewhat more flexible handle may be suitable in certain applications. The thickness of the polypropylene handle may be reduced, for example, for this purpose.

ABS plastic may also be used alternatively for the handle, although ABS is less preferred because it is more expensive than PVC foam or polypropylene.

While a handle length of 2 feet is suitable for some sizes of truck caps, an additional length, e.g., 3–6 inches, may be useful in certain applications, such as with larger truck caps and in other applications described below. A handle length of 2½ feet is advantageous in that it enables the cleaning device to reach more than halfway across any standard full-size truck cap installation. Also, the thickness of the handle may be more or less than ¼ inch in certain applications, although the thickness is preferably in the range of ⅛ to ½ inch.

Figure 4:
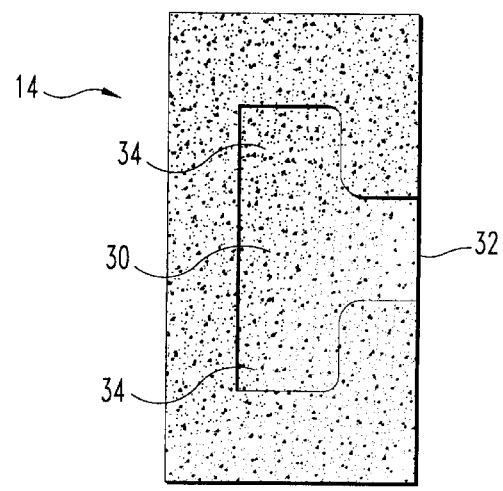
FIG. 4 is a cross-section of the sponge on the cleaning device of FIG. 1.

Sponge 14 may be a commercially available synthetic sponge 8 inches wide by 4½ inches long (axial length) by 3 inches thick, with a rectangular shape. An alternative thickness of 2 inches may be useful in certain applications, e.g., where the space between a truck cab and cap is relatively narrow. The sponge is cut to a prescribed depth and width to form a slot 30 therein that is sized and shaped to receive the cross member 16 of the handle. A hot knife is preferably used to create a superficial cut, e.g., ¼ to ½ inch into end surface 32 so as to provide a straight, smooth, barely perceptible seam when sealed closed as will be described. Another knife is then used to extend the depth of the cut to 3 inches. The superficial cut may be no wider than the handle, as shown in FIG. 4, or may be wider. The extended knife cut may likewise be only as wide as the handle or may be wider. In the former case, the lateral portions 34 of the slot in the sponge may be created with the cross member of the handle itself because the cross member tends to split the sponge and thereby extend slot 30 laterally upon insertion into the sponge.

With a PVC handle, the sponge may be adhesively affixed to the cross member, e.g., by means of silicone adhesive applied in the slot 30 and/or on the cross member. For example, prior to insertion of the cross member, a bead of adhesive may be placed in the slot at a depth of 2–3 inches and parallel to end surface 32, and another bead may be placed at the seam after insertion of the handle. The seam is held closed with a clamp or otherwise in a conventional manner, and excess adhesive at the seam is then trimmed off with a razor in a conventional manner.

Figure 6:
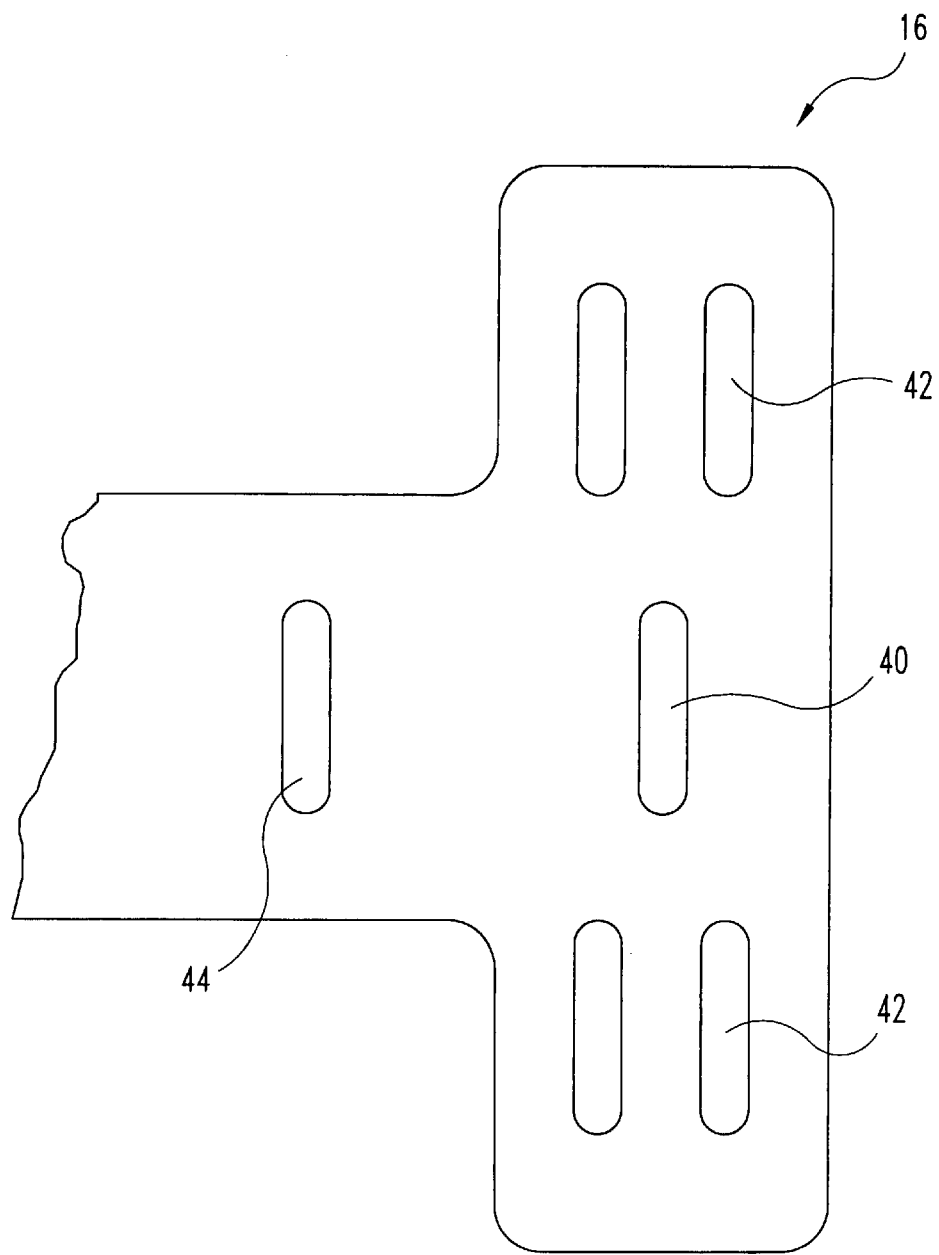
FIG. 6 is a top view of the head end of the handle according to another embodiment of the present invention.

When molded of polypropylene, the head end of the handle includes a pattern of slots as shown in FIG. 6, which is drawn to scale. Cross member 16 is molded with five slots, including a center slot 40 and a pair of slots 42 on each side thereof. The handle is molded with a sixth slot 44 with its longitudinal axis 1 inch away from cross member 16. A suitable size for each slot is 1 ⅛ inch by ¼ inch. The six slots facilitate adhesion of the split halves of the sponge to each other through the cross member, which does not bond well to the adhesive when made of polypropylene. Slot 44 is designed to be located at or closely adjacent to the seam in the sponge so as to facilitate an adhesive seal thereof. Preferably, adhesive is squeezed into each slot in the handle with the sponge installed but held open for this purpose. Alternatively, the adhesive may be applied to the slots in the handle before the handle is inserted into the sponge. As another alternative, the sponge may be molded directly onto a preformed handle, in which case no adhesive is used.

Among other applications, the invention is useful for cleaning relatively inaccessible parts of vans, RVs and the like. For example, a utility/box van or a "van style" camper/RV has an area referred to as an "attic" or "sleeper" which extends forward over the top of the cab of the vehicle. The underside of this area and the top surface of the cab which it covers can be readily cleaned with a cleaning device according to the present invention. As another example, insect shields of the type commercially available for the protection of the grills of RVs and other vehicles are typically attached such that there is an area between the shield and the front of the vehicle that is virtually inaccessible without removing the shield, which is a substantial inconvenience. The narrow space between the insect shield and the front of the vehicle can be readily cleaned with a cleaning device according to the present invention. The sponge may be provided with a tapered tip for some applications, such as for cleaning the bottom inside surface of an automobile windshield of the type extending substantially forward of the steering wheel and mounted at an acute angle with respect to the dashboard. In such an application, a sponge face on only one side of the handle may be suitable.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A cleaning device for narrow spaces of motor vehicles, comprising:

a one-piece, elongated, resilient handle having first and second ends and a minimum length of approximately two feet, said handle further having a transverse hand grip on said first end, said hand grip having a cross member perpendicular to the longitudinal axis of said handle, and wherein said handle and hand grip are both flat and coplanar; and a sponge mounted on said second end of said handle.

2. The cleaning device of claim 1, wherein said hand grip defines a slot between said cross member and the remainder of said handle.

3. The cleaning device of claim 2, wherein said handle is approximately ¼ inch thick, and wherein said cross member has an axial dimension in the range of 1 to 1½ inches.

4. A cleaning device for narrow spaces of motor vehicles, comprising:

a flat, one-piece, elongated, resilient handle having a parallel pair of major surfaces and adapted to deflect a distance of 4 inches over a given length of approximately 2 feet in an axial plane perpendicular to said major surfaces in response to a deflection force of approximately 5 ounces applied at one end of the given length in a direction perpendicular to said major surfaces in their relaxed state, said handle including a cross member integrally formed on one end thereof; and a sponge mounted on and enclosing said cross member on said one end of said handle and having an exposed sponge face on each major surface of said handle.

5. The cleaning device of claim 4, wherein said handle is approximately ¼ inch thick and has a main section in the range of 1½ to 2 inches wide.

6. The cleaning device of claim 5, wherein said handle has a transverse hand grip on a second end thereof.

7. The cleaning device of claim 6, wherein said handle is formed of foamed, closed-cell polyvinyl chloride.

8. The cleaning device of claim 6, wherein said handle is injection molded of polypropylene.

\* \* \* \* \*